United States Patent
Ishikawa

(10) Patent No.: US 6,495,077 B1
(45) Date of Patent: Dec. 17, 2002

(54) GATE CUT APPARATUS AND METHOD FOR A DISC MOLDING APPARATUS

(75) Inventor: Atsushi Ishikawa, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/386,448

(22) Filed: Aug. 31, 1999

(51) Int. Cl.⁷ ............................................. B29C 45/26
(52) U.S. Cl. ................. 264/40.5; 264/155; 264/161; 425/553; 425/566; 425/810
(58) Field of Search .............. 264/40.5, 161, 264/154, 155, 106, 328.9; 425/553, 554, 562, 564, 566, 810, 150, 135

(56) References Cited

U.S. PATENT DOCUMENTS

| | | | |
|---|---|---|---|
| 2,613,395 A | * 10/1952 | Massler | 264/161 |
| 4,260,360 A | * 4/1981 | Holmes et al. | 425/810 |
| 5,330,693 A | 7/1994 | Takada | |
| 5,551,858 A | * 9/1996 | Yoshizawa et al. | 264/161 |
| 5,552,095 A | * 9/1996 | Kudo et al. | 264/161 |
| 5,961,901 A | 10/1999 | Asai | |
| 6,027,328 A | * 2/2000 | Herbst | 264/161 |

FOREIGN PATENT DOCUMENTS

| EP | 467393 A2 * | 1/1992 |
|---|---|---|
| JP | 9-198723 | 7/1997 |

OTHER PUBLICATIONS

European Patent Publication No. 0 247 244 A2, by Kabushiki Kaisha Meiki Seisakusho, dated Dec. 2, 1997.
Abstract of Japanese Patent Publication No. 11254493, by Sumitomo Heavy Ind Ltd, dated Sep. 21, 1999.
*XP–002130027 and Abstract of Japanese Patent Publication No. 9198723, by Toray Ind Ltd, dated Jul. 31, 1997.
Abstract of Japanese Patent Publication No. 02155715, by Fuji Photo Film Co Ltd, dated Jun. 14, 1990.
Abstract—XS 9911715210 MA.

* cited by examiner

*Primary Examiner*—Jill L. Heitbrink
(74) *Attorney, Agent, or Firm*—Squire, Sanders & Dempsey L.L.P.

(57) ABSTRACT

A movable mold is disposed so as to face the stationary mold and to be advanceable and retractable. The movable mold forms a cavity in cooperation with the stationary mold when mold clamping is performed. A sprue is disposed to face the cavity and has a concave portion formed at a front end thereof. A cut punch is reciprocatively disposed to face the cavity at a position corresponding to the concave portion. The cut punch enters the concave portion when advanced. A drive section is provided to advance and retract the cut punch when driven. A controller drives the drive section such that during the mold clamping, the cut punch is advanced at a predetermined extension force in order to perform gate cutting and such that the extension force is made no greater than a preset value before the mold is opened.

16 Claims, 3 Drawing Sheets

GATE CUT APPARATUS AND METHOD FOR A DISC MOLDING APPARATUS

BACKGROUND OF THE INVENTION

1. Field of the Invention

The present invention relates to a cutting apparatus and method for molding, and more specifically, to a gate cut apparatus and method for a disc molding apparatus.

2. Description of the Related Art

Conventionally, in an injection molding machine, resin heated and melted within a heating cylinder is charged into a cavity formed in a mold apparatus. After the molten resin is cooled and solidified within the cavity, a molded product is removed from the cavity.

For injection of resin, a screw is disposed within the heating cylinder. When the screw is advanced, the resin is injected from an injection nozzle disposed at the front end of the heating cylinder. The injected resin then enters the cavity via a sprue and a gate.

A disc molding apparatus for molding a disc is provided with a gate cut apparatus. After resin is charged into a cavity, the gate cut apparatus is operated in order to separate a molded substrate within the cavity from the gate and to form a hole at the center of the molded substrate.

More specifically, before the resin within the cavity solidifies, the gate cut apparatus is operated in order to extend a cut punch. Subsequently, the mold is opened while the extension force of the cut punch is maintained, and a disc is then removed.

However, in the conventional gate cut apparatus for a disc molding apparatus, since the extension force is maintained even when starting the opening of a mold, the opening of a mold cannot be performed with accurate timing and speed. Therefore, molding defects due to an improper mold release are sometimes produced.

SUMMARY OF THE INVENTION

An improved cutting apparatus for a molding apparatus is provided, comprising: a cutting apparatus for a molding apparatus, comprising: a first mold; a second mold disposed so as to face said first mold and to be advanceable and retractable, said second mold forming a cavity in cooperation with said first mold when the movable mold is abutted against the stationary mold during mold clamping; a cut punch reciprocatively disposed to advance into and retract from the cavity; a drive section adapted to advance and retract said cut punch when driven; and a controller controlling the driving of said drive section such that during the mold clamping, said cut punch is advanced at a predetermined extension force in order to perform a cutting of a portion of a molded product within the cavity and such that the extension force is made no greater than a preset value before the mold is opened.

BRIEF DESCRIPTION OF THE DRAWINGS

The structure and features of the cutting apparatus and method for a molding apparatus according to the present invention will be readily appreciated as the same become better understood by referring to the accompanying drawings, in which.

DETAILED DESCRIPTION

Figure 1:
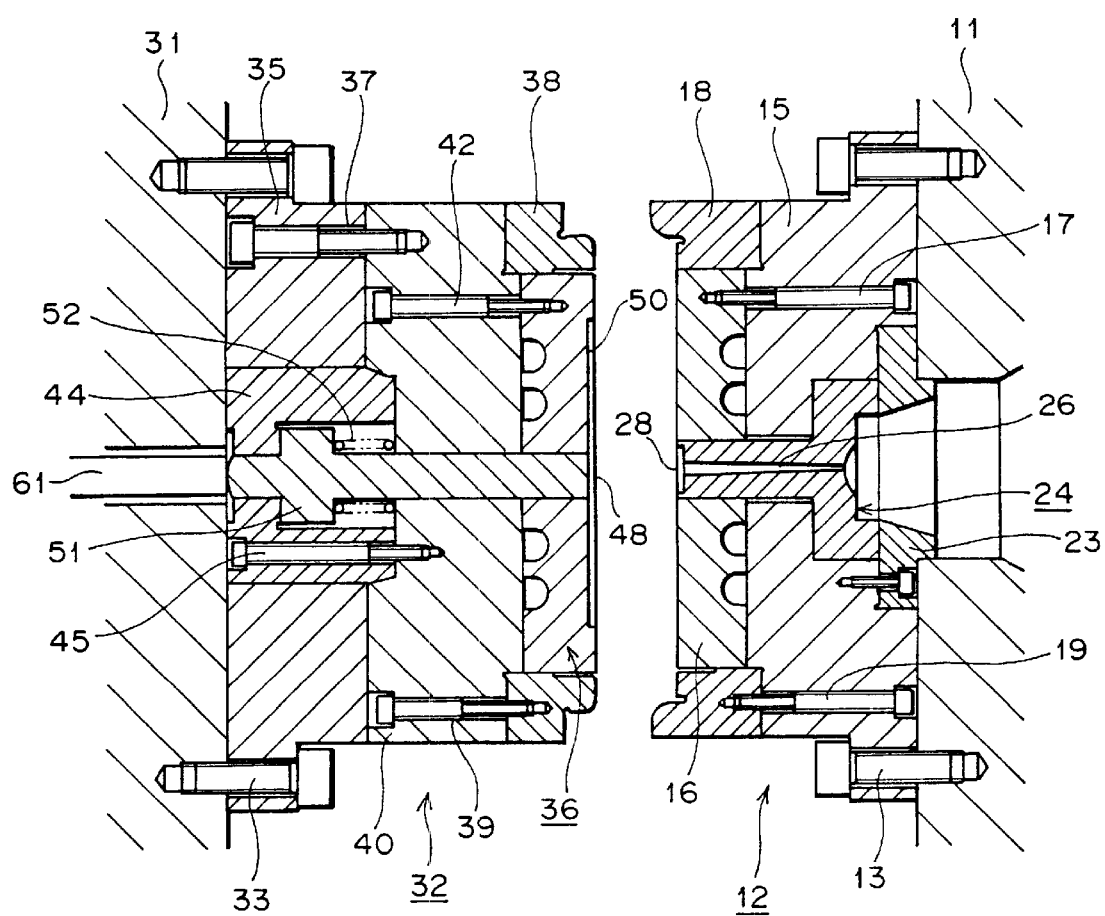
FIG. 1 is a sectional view of an example of a disc molding apparatus according to an embodiment of the present invention in a state in which a mold is opened.

FIG. 1 is a sectional view of an example of a disc molding apparatus according to an embodiment of the present invention in a state in which a mold is opened.

In FIG. 1, reference numeral 11 denotes a stationary platen, and reference numeral 12 denotes a stationary-side assembly fixed to the stationary platen 11 by use of bolts 13 and serving as a stationary mold. The stationary-side assembly 12 comprises a stationary-side base plate 15; a stationary-side disc plate 16 fixed to the stationary-side base plate 15 by use of bolts 17; an annular stationary-side guide ring 18 disposed to surround the stationary-side disc plate 16 and fixed to the stationary-side base plate 15 by use of bolts 19; a locating ring 23 disposed on the stationary-side base plate 15 to face the stationary platen 11 and adapted to position the stationary-side base plate 15 relative to the stationary platen 11; and a sprue bush 24 disposed in the vicinity of the locating ring 23.

A sprue 26 is formed at the center of the sprue bush 24 in order to allow passage of resin injected from an unillustrated injection nozzle. The front end (the left end in FIG. 1) of the sprue bush 24 faces an unillustrated cavity, and a die 28; i.e., a concave portion for receiving a cut punch 48, is formed in the front end.

Unillustrated stamper plate attachment/detachment bushes, stationary-side air-blow bushes, and like components are disposed in the stationary-side assembly 12.

Reference numeral 31 denotes a movable platen, and reference numeral 32 denotes a movable-side assembly fixed to the movable platen 31 by use of bolts 33 and serving as a movable mold. The movable-side assembly 32 comprises a movable-side base plate 35; an intermediate plate 40 fixed to the movable-side base plate 35 by use of bolts 37; a movable-side disc plate 36 fixed to the intermediate plate 40 by use of bolts 42; an annular movable-side guide ring 38 disposed to surround the movable-side disc plate 36 and fixed to the intermediate plate 40 by use of bolts 39; a spring holder 44 disposed in the movable-side base plate 35 to face the movable platen 31 and fixed to the intermediate plate 40 by use of bolts 45; and a cut punch 48 disposed such that it can be advanced and retracted. The rear-end portion of the cut punch 48 is held by the spring holder 44, and the front end of the cut punch 48 faces the cavity and has a shape corresponding to the die 28.

Further, a concave portion 50 is formed on a surface of the movable-side disc plate 36 facing the stationary-side disc plate 16. Accordingly, when the movable platen 31 is moved toward the stationary platen 11 through operation of an unillustrated mold clamp apparatus in order to bring the movable-side disc plate 36 in contact with the stationary-side disc plate 16 to thereby perform mold clamping, the concave portion 50 is closed by the stationary-side disc plate 16, so that a cavity is formed.

Within the spring holder 44 is disposed a spring retainer 51 formed integrally with the cut punch 48. A cut-punch return spring 52 is disposed on the front side (on the right side in FIG. 1) of the spring retainer 51. Therefore, the cut-punch return spring 52 urges the cut punch 48 rearward (leftward in FIG. 1). Further, a rod 61 is disposed such that the rod 61 can advance and retract and is in contact with the rear end of the cut punch 48.

Unillustrated ejector bushes, ejector pins, movable-side air-blow bushes, and like components are disposed in the movable-side assembly 32.

In the disc molding apparatus having the above-described structure, through operation of the mold clamping apparatus, the movable-side assembly 32 can be advanced (moved rightward in FIG. 1) in order to perform mold closing; the movable-side assembly 32 can be pressed against the stationary platen 11 in order to clamp the mold (mold clamping); and the movable-side assembly 32 can be retracted (moved leftward in FIG. 1) in order to open the mold (mold opening).

At a predetermined time when the mold is clamped, the cut punch 48 is advanced with a predetermined push-out force such that the cut punch 48 enters the die 28, and the sprue 26 and the cavity are separated from each other by the cut punch 48. Thus, gate cutting is completed and a hole is formed in an unillustrated substrate molded within the cavity.

Figure 2:
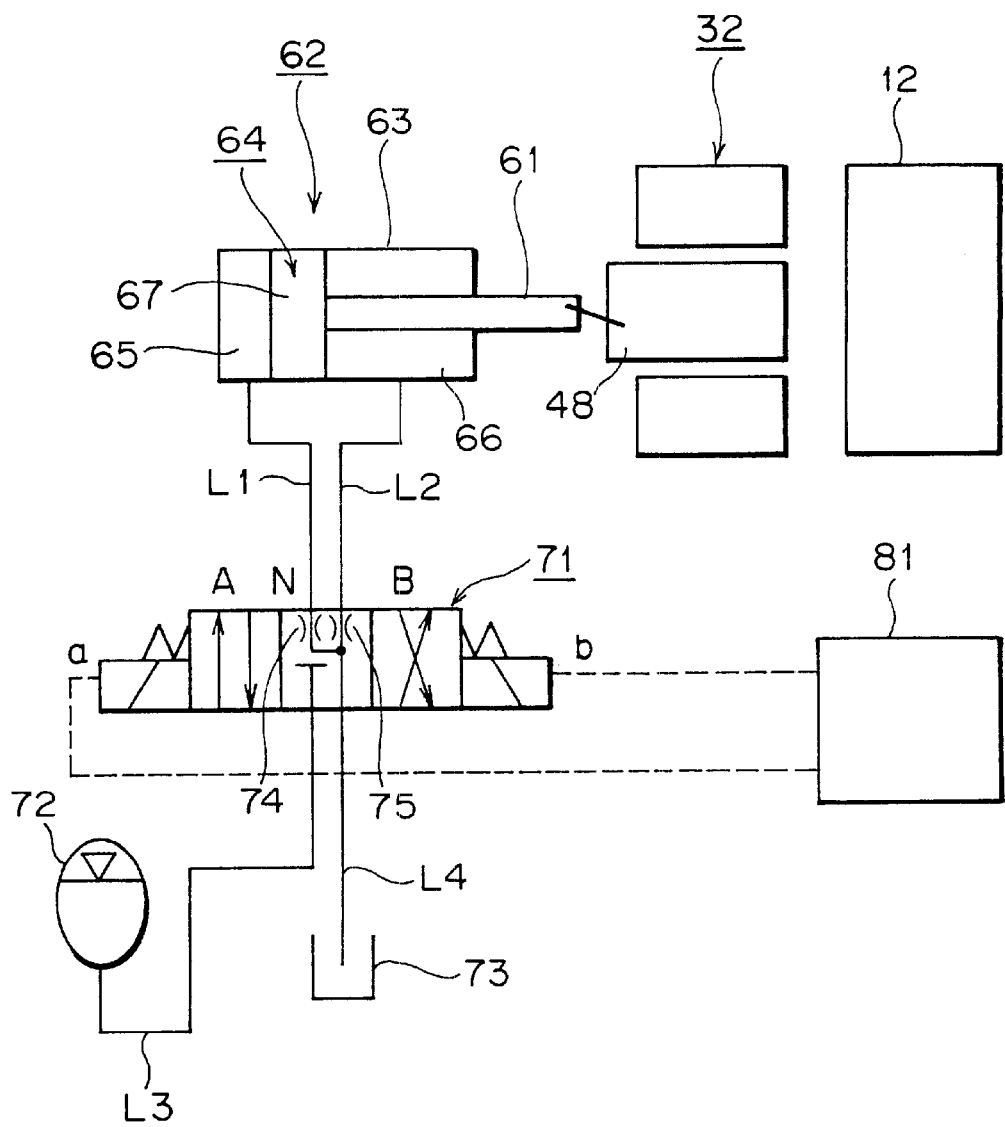
FIG. 2 is a schematic view of the example gate cut apparatus according to the embodiment of the present invention.

FIG. 2 is a schematic view of one example of gate cut apparatus according to the embodiment of the present invention.

In FIG. 2, reference numeral 12 denotes the stationary-side assembly, reference numeral 32 denotes the movable-side assembly, reference numeral 48 denotes the cut punch, and reference numeral 62 denotes a gate cut cylinder serving as a drive section. The gate cut cylinder 62 is composed of a cylinder body 63 and a piston 64 slidably disposed within the cylinder body 63. The piston 64 is composed of a head 67 and a rod 61 projecting frontward (rightward in FIG. 1) from the head 67. Therefore, through drive of the gate cut cylinder 62, the cut punch 48 can be advanced and retracted (moved rightward and leftward in FIG. 1).

More specifically, the interior of the cylinder body 63 is divided by the piston 64 such that a first oil chamber 65 is formed on the side of the head 67, and a second oil chamber 66 is formed on the side of the rod 61. The gate cut cylinder 62 is connected to an electromagnetic valve 71 via lines L1 and L2. The electromagnetic valve 71 is connected to an accumulator 72 via a line L3 and to an oil tank 73 via a line L4. When a command signal is supplied from a controller 81 to a solenoid a or b, the electromagnetic valve 71 assumes position A, B, or N. At position A, the electromagnetic valve 71 establishes communication between the lines L1 and L3 and between the lines L2 and L4. At position B, the electromagnetic valve 71 establishes communication between the lines L1 and L4 and between the lines L2 and L3.

Accordingly, when the solenoid a is excited to place the electromagnetic valve 71 at position A, oil within the accumulator 72 is supplied to the first oil chamber 65, so that the rod 61 is advanced (moved rightward in FIG. 1). As a result, the cut punch 48 is advanced. When the solenoid b is excited to place the electromagnetic valve 71 at position B, oil within the accumulator 72 is supplied to the second oil chamber 66, so that the rod 61 is retracted (moved leftward in FIG. 1). As a result, the cut punch 48 is retracted.

Further, when neither the solenoid a nor the solenoid b is excited, or when the electromagnetic valve 71 is placed at position N, the lines L1 and L2 are brought into communication with the line L4, so that oil within the first and second oil chambers 65 and 66 is discharged to the oil tank 73 via throttles 74 and 75 formed within the electromagnetic valve 71. In this case, the electromagnetic valve 71 is brought into a null state, so that neither an extension force nor a retraction force is generated.

Resin is charged into an unillustrated cavity in a state in which mold clamping has been performed. Before the resin within the cavity solidifies, the gate cut apparatus is operated in order to extend the cut punch 48. In the prior art, the movable-side assembly 32 is subsequently retracted while the extension force is maintained. In this case, since the extension force is maintained even when starting the opening of the mold, the movable-side assembly 32 cannot be retracted with accurate preset timing and speed. Therefore, variations arise in mold release, so that molding defects are sometimes produced.

In order to solve this problem, controller 81 decreases the extension force of the cut punch 48 to a level lower than a preset level, for example, to zero before performance of mold opening. For this purpose, controller 81 stops excitation of the solenoid a in order to place the electromagnet valve 71 to position N to thereby drain the oil within the first and second oil chambers 65 and 66 to the oil tank 73. As a result, the extension force of the cut punch 48 becomes zero although the cut punch 48 is moved to the advanced position.

Subsequently, the mold is opened., Since the cut punch 48 is maintained at the advanced position (extended into the cavity), the disc does not fall from the cavity (because the disc is held by cut punch 98 at the center hole of the disc). After removal of the disc, controller 81 excites the solenoid b in order to place the electromagnetic valve 71 at position B to thereby supply oil to the second oil chamber 66. As a result, the cut punch 48 is retracted.

Since the extension force of the cut punch 48 is made smaller than a preset value before the mold is opened, as described above, the movable-side assembly 32 will not be retracted while the extension force is maintained. Therefore, the movable-side assembly 32 can be retracted with accurate timing and speed, so that molding defects due to improper mold release are not produced.

In the present embodiment, the gate cut cylinder 62 is used as a drive section for driving the gate cut apparatus. However, an electric motor may be used in place of the gate cut cylinder 62.

In this case, a gate cut motor is used as the electric motor, and the drive section control means decreases or stops a supply of current to the gate cut motor before mold opening is performed.

Controller 81 may be any well known controller, including a computer, a digital controller, an analog controller, etc.

Figure 3:
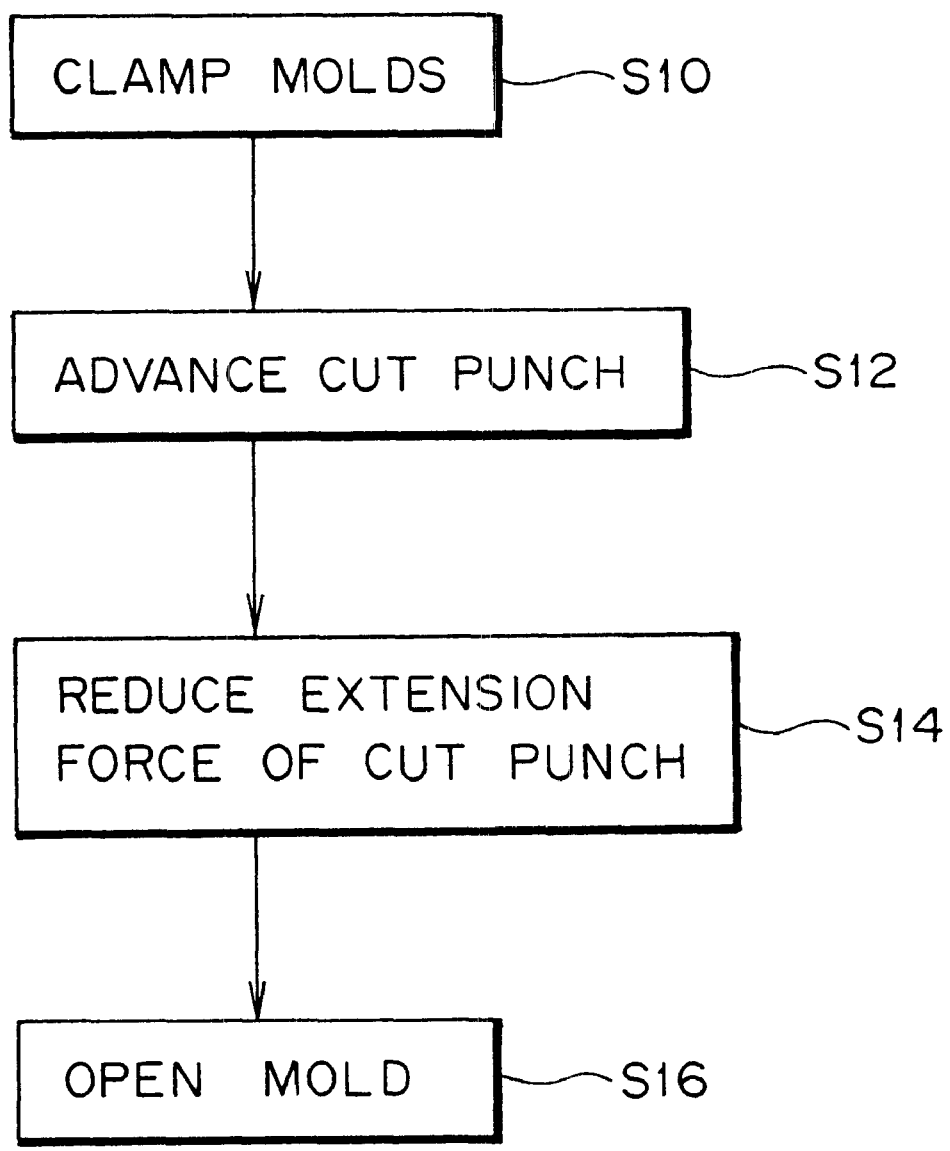
FIG. 3 illustrates an example of a method according to the present invention.

FIG. 3 illustrates an example of a method according to the present invention. In step S10, a first mold is pressed against a second mold to perform a mold clamping. In step S12, a cut punch is advanced into a cavity formed by the first and second molds to cut a portion of a molded product therein. In Step S14, an extension force of the cut punch is reduced so that the extension force is no greater than a predetermined value. In Step S16, the mold is opened.

Accordingly, because the extension force is reduced before the mold is opened, the opening of the mold can be done with accurate timing and speed, thereby reducing or eliminating molding defects due to an improper mold release.

Further, this method may be utilized for a gate cutting for a disc molding. When the molds are opened in a disc molding, the disc may be held by the cut punch which is still extended within the cavity. However, because the extension force of the cut punch has been reduced, the mold opening is performed with accurate timing and speed, thereby reducing molding defects due to an improper mold release.

It is emphasized that the present invention is not limited to the above-described detailed examples. Numerous modifications and variations of these detailed examples are possible in light of the spirit of the present invention, and they are not excluded from the scope of the present invention.

Many advantages of the various aspects of the above described detailed examples will be apparent to those skilled in the art. However, not all of these aspects are intended to be a necessary part of the invention as it is most broadly defined. The spirit and scope of the invention is intended to be defined only by the following claims.

What is claimed is:

1. A gate cut method for a disc molding apparatus, comprising the steps of:

(a) pressing a first mold against a second mold to thereby perform mold clamping and to thereby form a cavity;

(b) generating an extension force on a drive section and advancing a cut punch into the cavity, while the mold clamping is performed, to thereby cut a portion of a molded product within the cavity; and (c) reducing an extension force of said drive section and said cut punch such that the extension force is no greater than the predetermined extension force before and when the mold is opened; and (d) opening the mold.

2. The method of claim 1, further comprising injection a resin into the cavity via a sprue having a concave portion formed at a front end thereof at a position opposite the cut punch, and wherein step (b) includes entering the concave portion of the sprue thereby performing a gate cutting.

3. The method of claim 1, wherein step (a) includes forming a disc-shaped cavity.

4. The method of claim 1, wherein step (c) includes reducing an extension force to substantially zero.

5. The method of claim 1, wherein step (c) includes maintaining an extended position of the cut punch within the cavity while reducing the extension force.

6. A cutting apparatus for a molding apparatus, comprising:

a first mold;

a second mold disposed so as to face said first mold and to be advanceable and retractable, said second mold forming a cavity in cooperation with said first mold when said second mold is abutted against said first mold during mold clamping;

a cut punch reciprocatively disposed to advance into and retract from the cavity;

a drive section adapted to advance and retract said cut punch when driven; and a controller controlling the driving of said drive section such that during the mold clamping, said cut punch is advanced at a predetermined extension force in order to perform a cutting of a portion of a molded product within the cavity and such that the extension force is made no greater than said predetermined extension force before and when the mold is opened.

7. A cutting apparatus for a molding apparatus according to claim 6, wherein said drive section is a gate cut cylinder responsive to said controller to drain oil from an oil chamber of said gate cut cylinder before opening the mold.

8. A cutting apparatus for a molding apparatus according to claim 6, wherein said drive section is a gate cut motor and a supply of current to said gate cut motor is decreased or stopped in response to said controller before the mold is opened.

9. A cutting apparatus for a molding apparatus according to claim 6, further comprising:

a sprue having a concave portion formed at a front end thereof at a position opposite said cut punch within the cavity, wherein said cut punch enters the concave portion of the sprue when the cut punch is advanced thereby performing a gate cutting.

10. A cutting apparatus for a molding apparatus according to claim 6, wherein the cavity formed by said first mold in cooperation with said second mold has a disc shape.

11. A cutting apparatus for a molding apparatus according to claim 6, wherein the extension force is reduced to substantially zero.

12. A cutting apparatus for a molding apparatus according to claim 6, wherein said controller controls the driving section such that the cut punch remains extended within the cavity when the extension force is made no greater than said predetermined extension force.

13. A cutting apparatus for a molding apparatus according to claim 6, wherein said first mold is a stationary mold.

14. An injection molding machine including the cutting apparatus according to claim 6.

15. A cutting apparatus for a molding apparatus, comprising:

first and second mold means which form a cavity for receiving a resin within the cavity to form a molded product;

punching means for punching the molded product to cut the molded product;

means for advancing and retracting the punching means; and means for controlling said means for advancing and retracting the punching means, said controlling means controlling the advancing force of the punching means to be a first predetermined force when the punching means punches the molded product to cut the molded product and for controlling the advancing force of the punching means to be a second predetermined force before and when the first and second mold means separate to allow the molded product to be removed, wherein said second predetermined force is less than said first predetermined force.

16. The gate cut apparatus for a molding apparatus of claim 15, wherein said second predetermined force is zero.

* * * * *